Nov. 4, 1952     E. BARTHOLOMEW     2,616,404
METHOD AND APPARATUS FOR SUPPLYING AUXILIARY FUEL
OR ANTIKNOCK FLUID TO INTERNAL-COMBUSTION ENGINES
Filed Oct. 7, 1948                             4 Sheets-Sheet 3
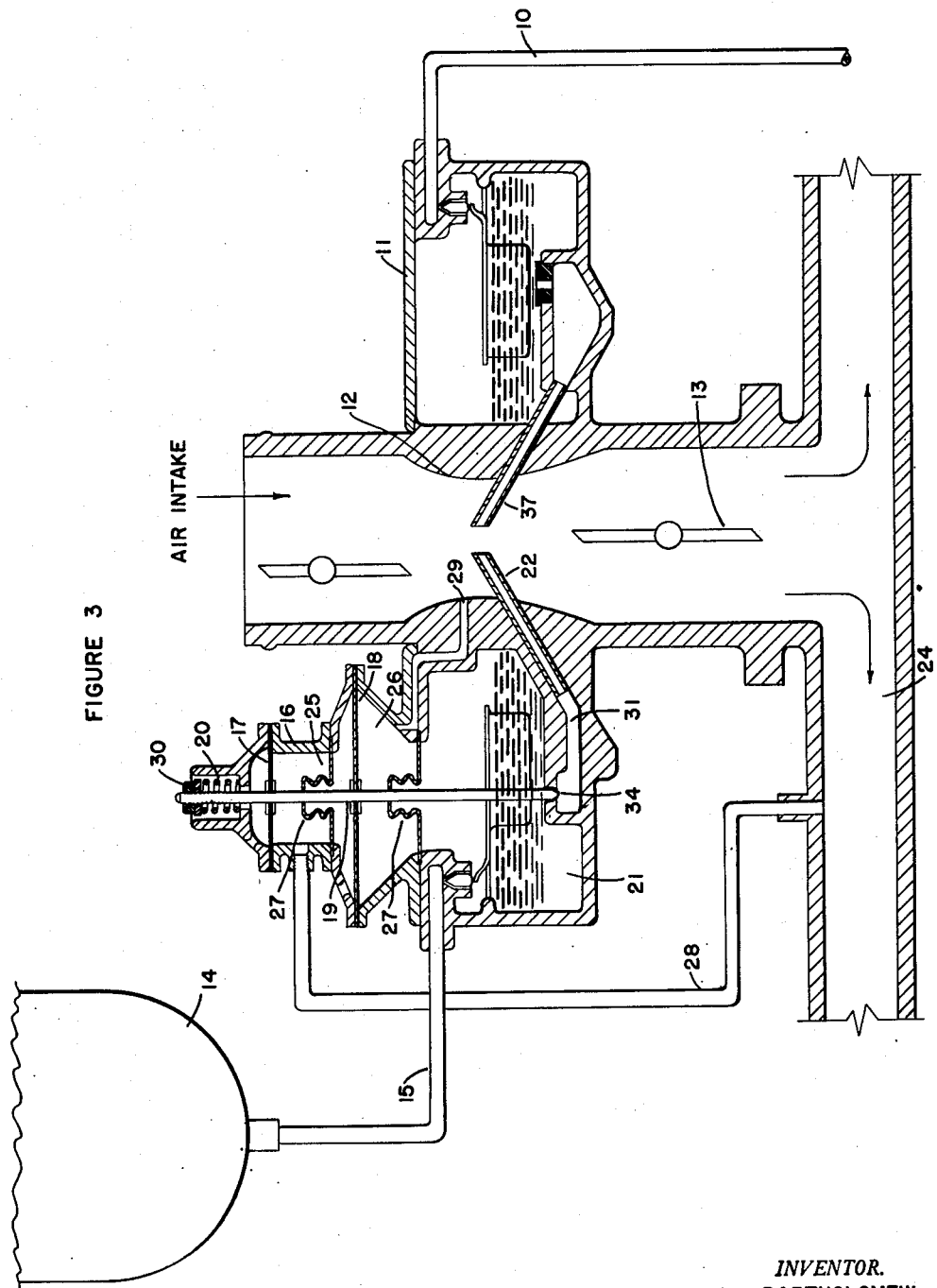
INVENTOR.
EARL BARTHOLOMEW
BY Kenneth Swartwood

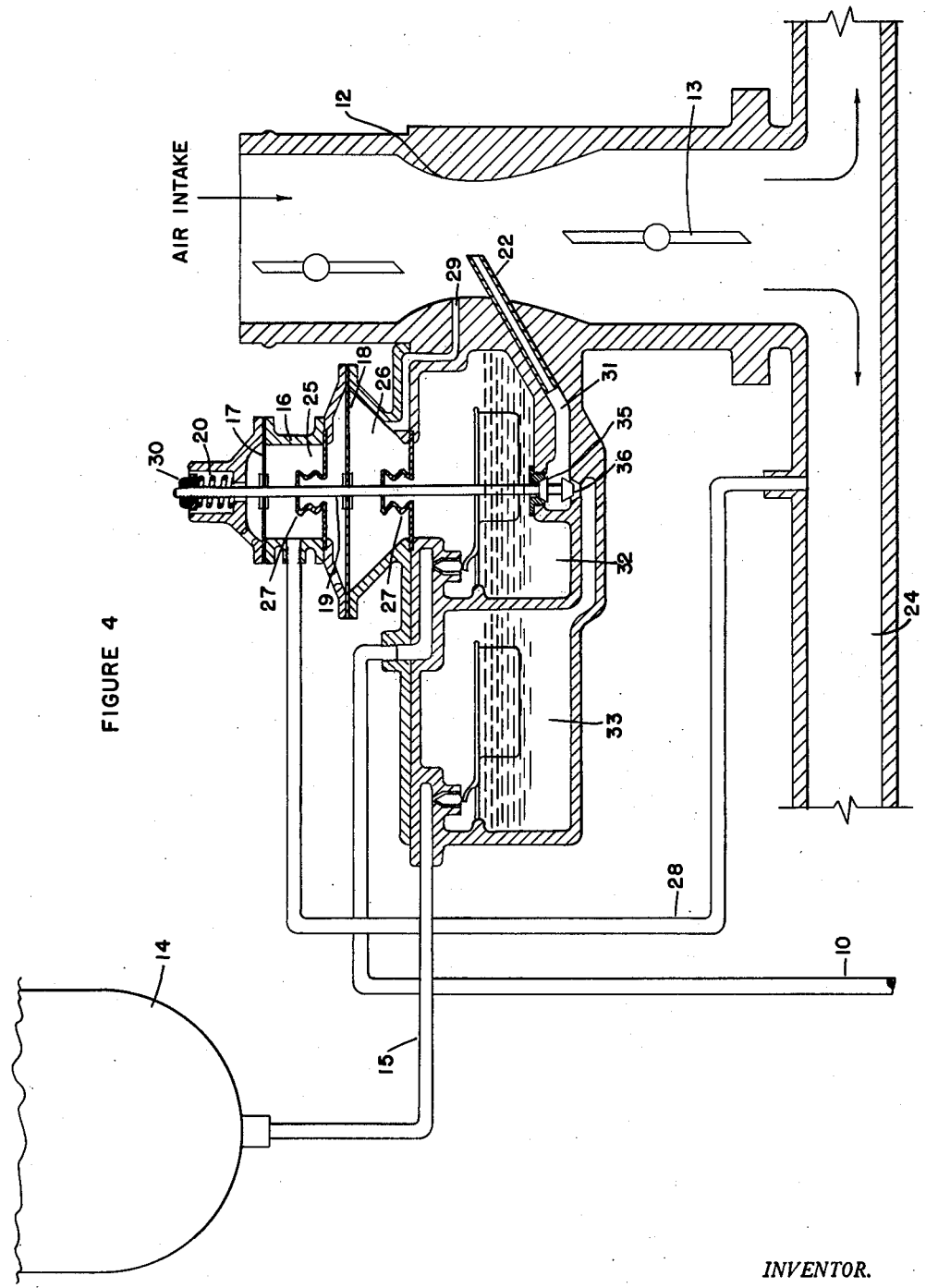

Patented Nov. 4, 1952

2,616,404

UNITED STATES PATENT OFFICE 2,616,404

METHOD AND APPARATUS FOR SUPPLYING AUXILIARY FUEL OR ANTIKNOCK FLUID TO INTERNAL-COMBUSTION ENGINES

Earl Bartholomew, Birmingham, Mich., assignor to Ethyl Corporation, New York, N. Y., a corporation of Delaware Application October 7, 1948, Serial No. 53,198

15 Claims. (Cl. 123—127)

My invention relates to methods and apparatus for regulating an auxiliary supply of a high antiknock fuel or an antiknock fluid to an internal combustion engine so that knocking is suppressed over the entire range of engine operation while at the same time the consumption of auxiliary fuel or antiknock fluid is minimized.

This is accomplished by controlling the supply of auxiliary fluid jointly in accordance with variation in the intake manifold vacuum and the rate of air-consumption by the engine.

My invention contemplates the use of such control for regulating or proportioning the supply of an auxiliary fuel having higher antiknock properties than the primary fuel supply or for regulating the supply of an antiknock fluid to the engine during its operation in order to meet variation in antiknock requirements with variation in engine conditions.

My control of the supply of auxiliary fuel or antiknock-fluid supply in accordance with the intake manifold vacuum and rate of air-consumption is applicable to injecting a supplemental quantity of high antiknock fuel or antiknock fluid as needed, in order to augment the antiknock properties of the primary fuel. It is also applicable to the proportioning of the supply of two fuels wherein an auxiliary fuel of relatively high antiknock properties is substituted as needed, for part or all of a primary fuel of relatively low antiknock properties.

My invention can be best understood, by referring to the drawings in which:

Figure 3 is a schematic drawing partially in cross-section, illustrating a device for control of supplementary injection of an auxiliary fuel or antiknock fluid.

Figure 4 is a schematic drawing partially in cross-section illustrating a device for automatically substituting a portion or all of one fuel for another in accordance with varying engine conditions.

In the normal operation of passenger car, truck and bus engines, knocking occurs during only a small fraction of the total operating time, and hence during the consumption of only a small fraction of the total gasoline used. The fuel antiknock requirement of such engines usually increases as the manifold vacuum decreases until it reaches a maximum at full throttle conditions. In addition the octane requirement of the engine decreases as engine speed increases, for full throttle operation and for conditions of constant intake manifold vacuum, as can be observed in Figure 1. If a primary fuel is provided which has sufficient antiknock quality for satisfactory operation under all engine conditions, there is an excess of antiknock quality during a large proportion of the operation of the engine.

Figure 1:
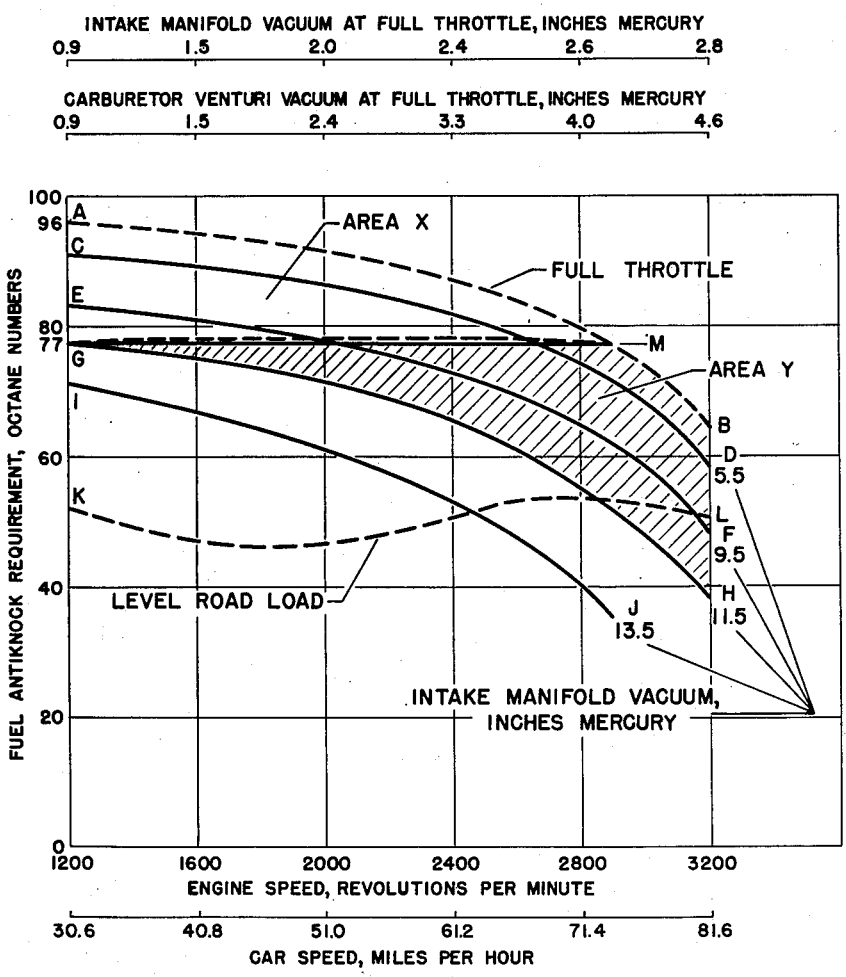
Figure 1 is a plot of fuel antiknock requirement of a typical high compression engine with automatic transmission over the speed range from 1200 to 3200 revolutions per minute, corresponding to vehicle speeds of approximately 30.6 to 81.6 miles per hour on a level road, at full throttle and for various conditions of constant intake-manifold vacuum.

This problem can be best understood by referring to Figure 1, in which curve A, M, B represents the octane number requirement at full throttle over a range of engine speeds for a particular engine. Curves CD, GH and IJ represent the fuel octane number requirement over the speed range at constant manifold vacuums of 5.5, 9.5, 11.5 and 13.5 inches of mercury, respectively. The term vacuum as used herein is defined as the differential in pressure between atmospheric and that at the point of measurement. The broken line K—L shows the octane number requirement for level road operation over a range of constant engine and corresponding constant vehicle speeds. The data represented in Figure 1 were obtained on a car having an automatic transmission which operates in a lower gear at road speeds below about 30 miles per hour with resulting increase in engine speed. Therefore the chart does not extend below a road speed of 30.6 miles per hour or an engine speed of 1200 revolutions per minute. For cars having a conventional change-gear transmission, the proportional scales of engine and car speed in high gear would be extended to the left, as would curves AMB, CD, EF, GH and IJ.

It is observed that this engine would require a 96 octane number fuel to give completely knock-free operation over the speed range included and yet this peak requirement occurs only at full throttle and at an engine speed of 1200 revolutions per minute. Thus there would be considerable excess of fuel antiknock quality when using this fuel at other operating conditions. Such excess is inherent in the use of a single fuel having sufficiently high antiknock quality to satisfy the maximum requirement of the engine. If the engine were supplied with a 77 octane number fuel, the engine would knock at all combinations of speed and manifold pressure above those represented by the 77 octane number line, which is the solid straight line connecting points G and M. Under all other conditions this engine would give knock-free operation on this fuel.

In an attempt to solve the problem of excess of fuel antiknock quality, it has previously been proposed by others to supply, in the conventional fuel tank of the vehicle, a primary fuel having sufficient antiknock quality at reduced throttle openings (for example at manifold vacuum in excess of the range of 6–11 inches of mercury) and to supplement this with appreciable amounts of an auxiliary fuel of relatively high antiknock quality by injection from an auxiliary tank when the throttle is in more nearly open or the fully open position. Usually the high antiknock quality fuel is injected into the intake manifold at some point between the carburetor and the cylinders.

Such previous injection devices have been designed to cut off the injection of the high antiknock quality fuel when the vacuum in the manifold reaches approximately 6 to 11 inches of mercury. As a result of this method of control, injection occurs over the entire speed range, when the manifold vacuum is less than that for cut-off whereas the knocking of normal engines is not uniform over the speed range but is greatest at the lower speeds and becomes progressively less as the speed is increased. For instance, if the engine whose fuel antiknock requirement data are presented in Figures 1 and 2, were to be operated on a relatively low antiknock fuel of 77 octane number, it would be necessary to set the device to feed the higher octane fuel during all engine operation at which manifold vacuum is less than 11.5 inches of mercury in order to prevent knocking at low speeds. With this system, injection between 1200 and 3200 revolutions per minute would be made at all operating conditions within both area X (defined by points A, M, G) and shaded area Y (defined by points G, M, B, H).

As the engine speed is increased, the range of manifold vacuum over which injection is required becomes progressively smaller until, at about 2700 revolutions per minute, injection is needed only at manifold vacuum below 5.5 inches of mercury. At this latter speed, all the fluid injected at manifold vacuum between 5.5 and 11.5 inches of mercury would be wasted. At engine speeds of 2900 revolutions per minute and higher, injection is not required, hence there would be a complete waste of the auxiliary fuel injected.

Furthermore, with injection controlled only by manifold vacuum, on a level road at constant speeds above 72 miles an hour, injection would be made continuously although it is not required.

At low speed, substantial enrichment of the mixture beyond that ordinarily employed causes no significant loss of engine power. However at high engine speeds the loss may be as much as 5 per cent. Thus in addition to the waste of high antiknock fuel at high speed associated with injection devices controlled by manifold vacuum alone, there is a substantial loss of engine power.

Waste of auxiliary fluid when injection is controlled by manifold vacuum alone could be avoided to some extent by selecting a primary fuel having an octane number near that of the highest octane requirement of the engine, as for example 90 octane number. In this case the injection device could be set to stop the flow of auxiliary fluid at a lower manifold vacuum of about 6.0 inches of mercury thereby eliminating injection at car speeds in excess of about 61 miles per hour. However, the use of a primary fuel having an octane number so close to that of the secondary fuel defeats the purpose of supplementary fuel injection, whose function is to permit the use of a primary fuel of relatively low antiknock value during most of the operation.

A similar waste in fuel antiknock quality results from the use of manifold vacuum alone for proportioning two fuels, wherein an auxiliary fuel of relatively high antiknock quality is substituted for a primary fuel of relatively low antiknock quality. In this case high antiknock quality is wasted whereas when an additional fluid is added both fuel and high antiknock quality are wasted.

It is, therefore, an object of this invention to provide a method and means for reducing or stopping the flow of auxiliary fuel or antiknock fluid as the speed of the engine is increased, in order to minimize the use and yet meet the antiknock requirements of the engine. In other words my object is to eliminate injection under conditions represented by area Y and to inject only under conditions represented by area X of Figure 1. A further object of my invention is to obtain such knock-free performance of the engine with substantially no loss of engine power at the higher speeds.

I accomplish these objects in the following manner: In addition to a control device actuated by the manifold vacuum, I employ a second vacuum-actuated element which is coordinated with the one actuated by the manifold vacuum. The second element is operated by the vacuum in a venturi, which may be the conventional carburetor venturi, located ahead of the throttle. The vacuum in the venturi is directly related to the rate of air-consumption. As the flow of air becomes greater with increase in engine speed or throttle opening, the vacuum in the venturi increases, tending first to reduce and then to stop the flow of auxiliary fuel.

The control of auxiliary fuel solely by change of vacuum in the venturi as the rate of air-consumption changes is more wasteful of high antiknock fuel than control by manifold vacuum alone. To illustrate, reference is made to Figure 2 which is similar to Figure 1 except that curves of constant vacuum are omitted for sake of clarity, and curves of constant rates of air consumption are superimposed, indicated by the quantities 385, 520, 636, 728, and 810 which express pounds per hour.

If the injection valve were controlled by Venturi vacuum alone and it were desired to operate this engine on a primary fuel having 77 octane number, the injection valve would be adjusted to close at a Venturi vacuum of approximately 4.2 inches of mercury corresponding to an air flow of 810 pounds per hour, i. e. the air consumption at full throttle at 2900 revolutions per minute (point M). At higher speeds, the full throttle octane number requirement is less than 77. By this control alone, injection would occur on a level road under all constant speed engine conditions represented by area X (previously defined) and area Z (defined by G, M, N, L, K), i. e. all the area above the level load line K—L. Areas below line K—L represent conditions of operation wherein the vehicle is either decelerating or descending a grade. With this method of control, flow of auxiliary fluid would also occur under the latter conditions, represented by the area extending below line K—L. Waste of antiknock material is more pronounced than when control by manifold vacuum is used alone.

Thus it is seen that neither control alone is sufficient to provide knock-free performance without waste of antiknock quality, fuel or both. However, when the injection valve is under the joint control of the manifold vacuum and the Venturi vacuum as shown in Figures 3 and 4 and subsequently described herein, the areas of the two diaphragms subjected to these two vacuums can be proportioned so as to provide complete cutoff along the broken line connecting points G and M in Figures 1 and 2. Injection, then, occurs only under engine conditions represented by the area above this line where the additional antiknock quality is required. Also by the joint control, modulation of flow is provided so that the amount of high octane material is approximately proportioned to the varying conditions under which knocking would occur on the primary fuel.

The broken line does not exactly follow the straight line connecting points G and M and therefore at some engine conditions the antiknock requirement would not be met by about one octane number. This is insignificant but, if operation without the slightest trace of knock were desired, a primary fuel of 78 octane number could be used.

Referring to Figure 3, a device is illustrated for controlling supplemental injection jointly by intake manifold and Venturi vacuum. Fuel line 10 is connected to a conventional carburetor 11 and to a conventional pump and fuel supply (not shown). Fuel fed to the carburetor is referred to in the specification and claims as the primary fuel or fluid. In general it is a fuel of relatively low antiknock properties composed in whole or in part of hydrocarbons and in most cases containing an antiknock agent such as tetraethyllead. However it may contain other antiknock agents or other fuels such as alcohols. The primary fuel is fed into venturi 12 through the conventional carburetor jet 37. The total quantity consumed is controlled by the manually operated throttle 13, in the usual manner.

The auxiliary fuel or antiknock fluid is contained in supply tank 14. This supply of material is referred to herein as auxiliary fuel or auxiliary antiknock fluid. It may be a hydrocarbon fuel of higher antiknock quality than the primary fuel and may contain an antiknock agent such as tetraethyllead or it may be an entirely different type of fuel which may contain antiknock agents. It is also within the scope of my invention that the auxiliary fluid comprise only an antiknock material such as aniline, tetraethyllead or other antiknock substances which may or may not be fuels within the usual meaning of the term. The auxiliary fluid should have sufficiently high antiknock properties to augment the antiknock properties of the primary fuel.

From the supply tank 14 the auxiliary fluid is introduced through line 15 to a float chamber 21 associated with regulating valve mechanism 16. The regulating valve mechanism 16 comprises two vacuum-actuated elements such as diaphragms 17 and 18 which are operatively connected to stem 19 of regulating valve 34. Spring 20 holds valve 34 normally in an open position allowing auxiliary fluid to flow during engine operation from float bowl 21, into passageway 31, through jet 22, to the venturi 12, to intake manifold 24 and thence to the cylinders of the engine. Leakage from chambers 25 and 26 is prevented by bellows type seals 27. Chamber 25 connects through line 28 to the intake manifold 24, and chamber 26 through passageway 29 to the venturi 12. Thus means are provided for actuating diaphragms 17 and 18 by vacuums in the intake manifold and the venturi, and for applying this action to the valve stem. An increase in manifold vacuum due either to a decreased throttle opening or an increase in Venturi vacuum due to increase in rate of air flow through the venturi will tend to close valve 34. At all times the total force acting on the valve stem is the sum of the forces produced by the two diaphragms. The injection valve and the control diaphragms can be so designed that the rate of reduction of flow of auxiliary fuel will follow any desired pattern of speed and manifold vacuum for a given engine and thus permit operation on a primary fuel having any selected octane number. By proper proportioning of diaphragms 17 and 18 and adjustment of the tension on spring 20 by nut 30, the cut-off pattern illustrated in Figures 1 and 2 can be obtained.

The net effective areas of the two diaphragms required to close the valve under either of the combinations of intake manifold and carburetor Venturi vacuums, corresponding to points G and M, is easily calculated by solving two simultaneous equations. One equation can be set up for the closing force on the valve at point G. This closing force is equal to the sum of the intake manifold vacuum and carburetor Venturi vacuum at point G multiplied by the net effective area of each of their respective diaphragms 17 and 18. A similar equation can be set up for the closing force on the valve at point M. These two closing forces are equal hence the two equations can be solved for the relative areas of the two diaphragms. The actual areas of diaphragms 17 and 18, in the calculated ratio, should be just sufficient for their combined forces to compress the chosen spring 20 and close valve 34 under conditions corresponding to points G and M. Usually it is desirable to have the diaphragms small for convenience. At the other speeds and throttle openings between points G and M, the combined effect of diaphragms 17 and 18 results in the closure of the injection valve substantially in accordance with the broken line G—M of Figures 1 and 2.

Once the areas of the two diaphragms are proportioned for a given engine and for a primary fuel of a given octane number, approximate adjustments for use with a different octane number primary fuel within a reasonable range can be made by nut 30. The size of jet 22 is so selected that when valve 34 is wide open, the jet will flow a sufficient amount of auxiliary fuel to prevent knocking at low speed and wide-open throttle. The relative amount of auxiliary fuel required will depend on the octane number requirement of the engine, and the octane number of the primary as well as the octane number of the auxiliary fuel. Part of the effect of the auxiliary fuel in reducing knock is due to its antiknock blending value, and the remainder results from enrichment of the fuel-air mixture which enters the cylinders. Enrichment alone is a fairly effective means of knock suppression.

When alcohol is used as the auxiliary fuel with present day engines, the flow rate is generally in the range of 10 to 40% of the primary fuel flow at wide-open throttle conditions. For over-the-road operation the amount of alcohol used ordinarily is from 1 to 10% of the primary fuel consumption, depending on the type of operating conditions encountered.

Another embodiment of my invention is illustrated in Figure 4 which is similar to Figure 3 in many respects. The device in Figure 3 applies to an operation wherein the primary fuel supply is controlled by a throttle and the additional high antiknock fuel is automatically supplied as needed. Figure 4 illustrates the use of my device in an operation wherein a relatively high antiknock fuel is substituted in whole or in part for the primary fuel, as needed. In contrast to the arrangement illustrated in Figure 3 the mixture ratio resulting from the use of the device in Figure 4 is always within the range normally supplied by conventional carburetors. The proportioning means for the two fuels is controlled jointly by intake manifold and Venturi vacuum in the same manner as the additional supply of auxiliary fluid is controlled in Figure 3. In Figure 4, float chambers 32 and 33 are used for relatively low and high antiknock fuels, respectively. Valves 35 and 36 are attached to valve stem 19 and seat in opposite directions so that as valve 36 is opening away from its seat to allow more high antiknock fuel to enter passageway 31, valve 35 is closing toward its seat thereby reducing the flow of low antiknock fuel to the passageway 31. Thus proportioning means are provided which are jointly controlled by the two sources of vacuum according to variation in engine speed and manifold vacuum in order to meet the antiknock requirements of the engine. The use of my device for this type of operation minimizes the consumption of high antiknock quality fuel without increasing the total quantity of fuel normally used. With this type of operation, the amount of high octane fuel used depends on the fuel antiknock requirement of the engine, the octane number of both fuels, and the type of operating conditions. With present day engines and fuels, the amount of high octane fuel consumed usually is from 5 to 50 per cent of the total depending on the vehicle and type of operation on the road.

During the start of acceleration from low speed with an automatic transmission, or in high gear with a conventional change-gear transmission, the engine is usually operated at full throttle by the average driver of the vehicle. If the driver continues acceleration at full throttle, as he frequently does, the vacuum in the carburetor venturi increases with the increase in engine speed, causing diaphragm 17 to move the auxiliary fuel valve toward the closed position. When a speed and Venturi pressure corresponding to point M of Figures 1 and 2 have been reached; the valve closes completely. At higher speeds no injection occurs.

With a conventional change-gear transmission, acceleration in first or second gears is often done at part throttle, as may also be done with an automatic transmission. In this event injection is cut off under conditions represented by broken line G—M. Thus the use of my invention generally results in a large saving of auxiliary fuel during acceleration.

Figure 2:
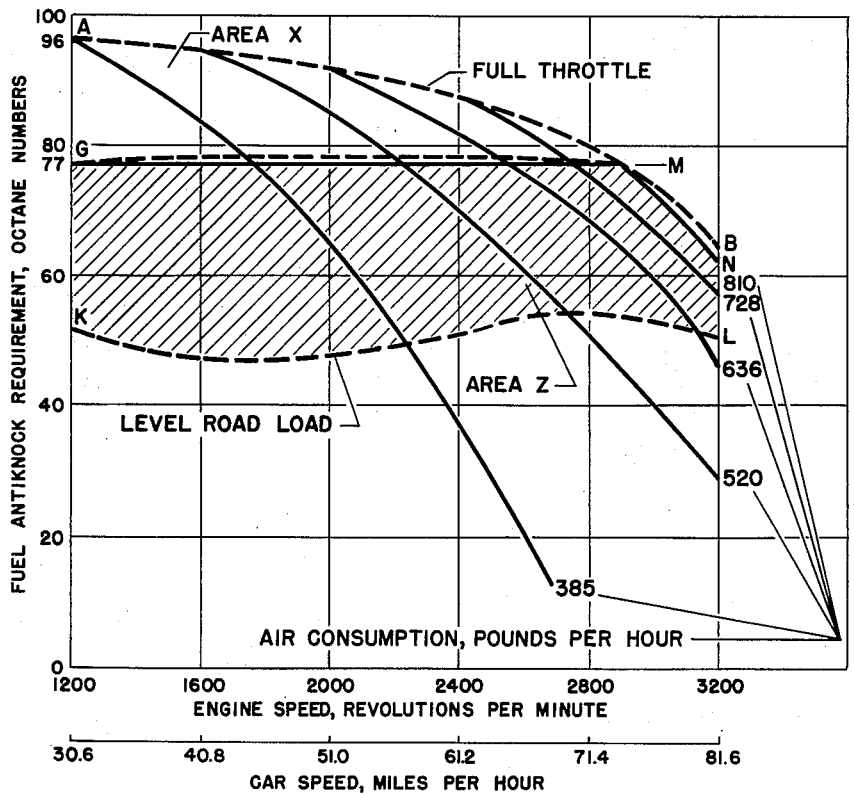
Figure 2 is a plot similar to Figure 1 except that curves of constant air-consumption have been superimposed and the curves of constant intake manifold have been omitted for the sake of clarity.

All vehicles operate a part of the time under engine conditions represented by area X of Figures 1 and 2 and would therefore receive the benefit of modulated injection provided by my device. All vehicles also operate a part of the time, and some, such as trucks and busses, the greater part of the time under conditions represented by area Y of Figure 1 and area Z of Figure 2, under which conditions no injection occurs during the use of my device. Thus under any condition of engine operation the use of my invention limits the consumption of auxiliary high antiknock fuel to the minimum necessary for suppression of knocking and thereby effects large savings over devices controlled either by manifold vacuum or carburetor Venturi vacuum alone.

Other modifications of my invention are possible within the scope of the following claims:

I claim as my invention:

1. In a dual fuel supply apparatus for internal combustion engines having a fuel induction system including an air-intake with a venturi therein, and an air-fuel intake manifold, a proportioning device comprising a control valve for a primary fuel, a control valve for a secondary fuel, pressure actuating members for said valves, a pressure chamber associated with each of said members, one of which is adapted to be connected with the venturi and the other adapted to be connected with the intake manifold.

2. For an internal combustion engine having a fuel induction system including an air-intake, fuel supply means, and an air-fuel intake manifold, the improvement comprising proportioning means for varying the supply of a primary fluid containing a hydrocarbon fuel and having relatively low antiknock properties and an auxiliary fluid having relatively high antiknock properties, said proportioning means having operative means connected therewith and connectable to said induction system, and said operative means fully responsive to joint control by the rate of air supply through said induction system and by the vacuum in said intake manifold.

3. For an internal combustion engine having a fuel induction system including an air-intake having a venturi therein, dual fuel supply means, and an air-fuel intake manifold, the improvement comprising proportioning means for varying the supply of a primary fuel having relatively low antiknock properties and an auxiliary fuel having relatively high antiknock properties, means operating said proportioning means comprising a first vacuum actuated element and a second vacuum actuated element cooperatively connected with and jointly operating said proportionating means, said first element having conduit means in open communications with said venturi applying the vacuum therein to said element, and said second element having conduit means in open communication with said intake manifold applying the vacuum therein to said second element.

4. An auxiliary device for supplying antiknock fluid to an internal combustion engine, comprising in combination a container for said fluid with a passage opening therefrom to the fuel intake system of the engine, dual actuated regulating means for controlling the amount of fluid entering said passage, said regulating means being responsive to any change in the vacuum in both the carburetor venturi and the air-fuel intake manifold and tending to close said passage as said vacuum increases and to open said passage as said vacuum decreases.

5. An auxiliary device for supplying antiknock fluid to an internal combustion engine, comprising in combination a container for said fluid with a passage opening therefrom to the fuel intake system of the engine, a dual actuated valve for controlling the amount of fluid entering said passage, said valve being operated by and responsive to the combined action of two diaphragms, one of which is responsive to any change in the vacuum in the carburetor venturi and the other of which is responsive to any change in the vacuum in the intake manifold, each of said diaphragms tending to close said valve as the vacuum to which it is responsive increases, and to open said valve as said vacuum decreases.

6. An auxiliary device for supplying antiknock fluid to an internal combustion engine, comprising in combination a container for said fluid with a passage opening therefrom to the carburetor, a dual actuated single acting valve for controlling the amount of fluid entering said passage, said valve being operated by and responsive to the combined action of two diaphragms, one of which is responsive to any change in the vacuum in the carburetor venturi and the other of which is responsive to any change in the vacuum in the air-fuel intake manifold, each of said diaphragms tending to close said valve as the vacuum to which it is responsive increases, and to open said valve as said vacuum decreases.

7. A device for proportioning the relative quantities of two fuels of different antiknock rating which are fed to an internal combustion engine, comprising in combination a container for a primary fuel and a container for an auxiliary fuel of higher antiknock rating, a passage from each of said containers to the carburetor, a dual actuated double acting valve for controlling the amount of fuel flowing from each of said containers to the carburetor, said valve being operated by two diaphragms, one of which is responsive to the vacuum in the carburetor venturi and the other of which is responsive to the vacuum in the intake manifold, each of said diaphragms tending to open the container for the primary fuel and to close the container for the auxiliary fuel as the vacuum to which it is responsive increases, and to reverse said operations as said vacuum decreases.

8. A method for changing the antiknock rating of a fuel for an internal combustion engine in accordance with the antiknock requirements of the engine under different operating conditions which comprises supplying to said engine a primary fuel of insufficient antiknock rating to provide for all operating conditions, and admixing with said primary fuel an auxiliary fluid of higher antiknock rating when the operating conditions of the engine so require, the amount of auxiliary fluid admixed as aforesaid being controlled by the additive effect of the vacuum dependent on the amount of air flowing to the carburetor and the vacuum in the air-fuel intake manifold decreasing as said effect increases, and increasing as said effect decreases.

9. A method for changing the antiknock rating of a fuel for an internal combustion engine in accordance with the antiknock requirements of the engine under different operating conditions which comprises supplying to said engine a primary fuel of insufficient antiknock rating to provide for all operating conditions, and admixing with said primary fuel an auxiliary fluid of higher antiknock rating when the operating conditions of the engine so require, the amount of auxiliary fluid admixed as aforesaid being controlled by the additive effect of the vacuum in the carburetor venturi and the vacuum in the air-fuel intake manifold, said amount decreasing as said effect increases and increasing as said effect decreases.

10. A method for changing the antiknock rating of a fuel for an internal combustion engine in accordance with the antiknock requirements of the engine under different operating conditions which comprises supplying to said engine a primary fuel of insufficient antiknock rating to provide for all operating conditions, and admixing with said primary fuel an auxiliary fluid of higher antiknock rating when the operating conditions of the engine so require, the amount of auxiliary fluid admixed as aforesaid being controlled by the additive effect of the vacuum in the carburetor venturi and the vacuum in the air-fuel intake manifold, said amount decreasing progressively as said effect increases until a point is reached at which substantially no auxiliary fluid is required whereupon the flow of said fluid is stopped, and increasing progressively as said effect decreases beyond the foregoing point.

11. A device for supplying auxiliary antiknock fluid to an internal combustion engine, comprising in combination a container for said fluid with a passage opening therefrom to the fuel intake system of the engine, regulating means for controlling the amount of fluid entering said passage, said regulating means being responsive to the combined effect of the vacuum dependent on the amount of air flowing to the induction system of the engine and the vacuum in the air-fuel intake passage, any increase in either of said vacuums having the same directional effect on said regulating means, and any decrease therein having the opposite directional effect.

12. A device for supplying auxiliary antiknock fluid to an internal combustion engine having throttle means for controlling the main fuel supply, comprising in combination a container for said fluid with a passage opening therefrom to the fuel intake system of the engine, regulating means for controlling the amount of fluid entering said passage, said regulating means being responsive to the combined effect of the vacuum before said throttle dependent on the air flow, and the vacuum after the throttle, any increase in either of said vacuums tending to decrease the flow of fluid entering said passage and any decrease in either of said vacuums tending to increase said flow of fluid.

13. A device for supplying auxiliary antiknock fluid to an internal combustion engine, comprising in combination a container for said fluid with a passage opening therefrom to the fuel intake system of the engine, regulating means for controlling the amount of fluid entering said passage, said regulating means being responsive to the combined effect of the vacuum in the carburetor venturi and the vacuum in the air-fuel intake manifold and tending to increase the flow of fluid through said passage as either of said vacuums decreases and to decrease the flow of fluid through said passage as either of said vacuums increases.

14. A device for proportioning the relative quantities of two fuels which are fed to an internal combustion engine, comprising in combination a container for a primary fuel and a container for an auxiliary fuel for enhancing the antiknock rating of the primary fuel, a passage from said containers to the carburetor, a proportioning device for controlling the amount of fuel flowing from each of said containers to the carburetor, said proportioning device being responsive to the combined effect of the vacuum before the throttle dependent on the air flow, and the vacuum after the throttle, any increase in either of said vacuums tending to decrease the proportion of auxiliary fuel in said passage and any decrease in either of said vacuums tending to increase the proportion of said auxiliary fuel.

15. A method for changing the antiknock rating of a fuel for an internal combustion engine in accordance with the antiknock requirements of the engine under different operating conditions which comprises supplying to said engine a primary fuel of insufficient antiknock rating to provide for all operating conditions, and admixing with said primary fuel an auxiliary antiknock fluid when the operating conditions of the engine so require, the amount of auxiliary fluid admixed as aforesaid being controlled by combining the effects of the vacuum dependent on the amount of air flowing to the carburetor and the vacuum in the air-fuel intake manifold, said effects being combined in such manner that as either of said vacuums decreases it tends to increase the amount of auxiliary fluid admixed with the primary fuel and as either of said vacuums increases it tends to decrease the amount of auxiliary fluid admixed with the primary fuel.

EARL BARTHOLOMEW.

REFERENCES CITED

The following references are of record in the file of this patent:

UNITED STATES PATENTS

| Number | Name | Date |
|---|---|---|
| Re. 22,447 | Hersey et al. | Feb. 29, 1944 |
| 1,676,828 | Howard et al. | July 10, 1928 |
| 2,377,607 | Bodine | June 5, 1945 |
| 2,382,625 | Garretson | Aug. 14, 1945 |
| 2,447,793 | Bolt et al. | Aug. 24, 1948 |
| 2,477,481 | Ericson | July 26, 1949 |